US010743165B1

(12) United States Patent
Patel et al.

(10) Patent No.: US 10,743,165 B1
(45) Date of Patent: Aug. 11, 2020

(54) AUTOMATICALLY PAIRING A BLUETOOTH LOW ENERGY (BLE) DEVICE TO A USER DEVICE

(71) Applicant: BOSE CORPORATION, Framingham, MA (US)

(72) Inventors: Hiren Harshad Patel, Chelmsford, MA (US); Anuj Dutt, Framingham, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/428,349

(22) Filed: May 31, 2019

(51) Int. Cl.
*H04W 4/80* (2018.01)
*H04B 5/00* (2006.01)
*H04W 76/14* (2018.01)
*H04W 84/18* (2009.01)

(52) U.S. Cl.
CPC .............. *H04W 4/80* (2018.02); *H04W 76/14* (2018.02); *H04W 84/18* (2013.01)

(58) Field of Classification Search
CPC ... H04W 4/8012; H04W 76/00; H04W 76/10; H04W 84/12; H04M 1/6066; H04M 1/7253; H04M 1/72527; H04M 2250/02; H04M 2250/52; H04M 1/72533; H04R 5/04; H04R 25/55; H04R 2227/005; H04R 2420/07; H04B 2201/71346
See application file for complete search history.

(56) References Cited

U.S. PATENT DOCUMENTS

| | | | |
|---|---|---|---|
| 9,282,096 B2* | 3/2016 | Goldstein | G06F 16/685 |
| 9,628,514 B2* | 4/2017 | Kaufman | H04W 12/06 |
| 9,949,065 B1* | 4/2018 | Zarakas | G06Q 20/3672 |
| 10,034,035 B2* | 7/2018 | Eber | G06F 16/337 |
| 10,089,066 B2* | 10/2018 | Kang | H04R 5/04 |
| 10,123,333 B2 | 11/2018 | Young et al. | |
| 10,136,214 B2* | 11/2018 | Smus | H04B 1/713 |
| 10,409,549 B2* | 9/2019 | Lang | H04R 27/00 |

* cited by examiner

*Primary Examiner* — Quochien B Vuong
(74) *Attorney, Agent, or Firm* — Patterson + Sheridan, LLP

(57) ABSTRACT

A method is provided for automatically pairing a user device to an audio output device. A user device generates an identifier and transmits an audio version of the identifier over a Bluetooth profile capable of transmitting audio to an audio output device. The audio output device generates a data version of the received identifier and transmits the data version of the identifier of a different link. The application running on the user device receives the data version of the identifier and automatically pairs with the audio output device.

15 Claims, 4 Drawing Sheets

AUTOMATICALLY PAIRING A BLUETOOTH LOW ENERGY (BLE) DEVICE TO A USER DEVICE

FIELD

Aspects of the disclosure generally relate to automatically paring a Bluetooth Low Energy (BLE) device to a user device. As described herein, a user device is paired to a BLE device over a first communication channel capable of transmitting audio. Using an identifier transmitted over the communication channel capable of transmitting audio, the BLE accessory device pairs to an application running on the user device over a second communication channel.

BACKGROUND

Classic Bluetooth ("Bluetooth") is a wireless communication technology standard for exchanging data between devices over short distances. In order to use Bluetooth, a device must be compatible with the subset of Bluetooth profiles, often called services, necessary to use the desired profile. A Bluetooth profile is a specification regarding an aspect of Bluetooth-based wireless communication between devices. Examples of Bluetooth profiles for communication of audio between a Bluetooth source device (e.g., user device, smartphone, tablet, or laptop) and a Bluetooth accessory device (e.g., audio output device such as Bluetooth audio headphones) include the Advanced Audio Distribution Profile (A2DP), Audio/Video Remote Control Profile (AVRCP), and Hands Free Profile (HFP). A2DP, also referred to as audio streaming, defines how multimedia audio can be streamed from one device to another over a Bluetooth connection. AVRCP, often used in conjunction with A2DP, provides remote control (e.g., play, pause, skip) on Bluetooth accessories such as headphones or stand-alone speaker units. HFP is used to allow a hands-free kit to communicate with cellular phones.

BLE offers low power consumption compared to Bluetooth, in part, by remaining in sleep mode except for when a connection is initiated. While Bluetooth can handle large amounts of data, it consumes battery life quickly. BLE is better suited for applications that do not need to exchange large amounts of data or applications that exchange small amounts of data periodically.

User devices and Bluetooth accessories are communicatively coupled over Bluetooth and BLE. A need exits for improving the pairing process between a user device and a Bluetooth accessory.

SUMMARY

All examples and features mentioned herein can be combined in any technically possible manner.

Aspects provide a method for pairing a user device to an audio output device, comprising: providing an application on the user device communicatively coupled to the audio output device over a Bluetooth profile capable of transmitting audio, the application configured to accept user input for managing an audio experience for a user of the audio output device; generating, by the application, an identifier; transmitting, by the user device, an audio version of the identifier over the Bluetooth profile capable of transmitting audio; receiving, by the application, the identifier from the audio output device; and pairing the audio output device with the application in response to the application receiving the identifier from the audio output device.

In an aspect, receiving, by the application, the identifier from the audio output device comprises receiving the identifier in a data packet. In an aspect, receiving, by the application, the identifier from the audio output device comprises receiving the identifier in an advertisement packet. In an aspect, receiving, by the application, the identifier from the audio output device comprises receiving the identifier over a Bluetooth low energy (BLE) channel.

In an aspect, the method further comprises using, by one of the application or the user device, dual tone multi frequency (DTMF) technology to generate the audio version of the identifier.

In an aspect, the method further comprises generating, by one of the application or the user device, the audio version of the identifier.

In an aspect, the audio version of the identifier transmitted over the Bluetooth profile capable of transmitting audio comprises a signal occupying frequencies substantially outside an audible range of human hearing.

In an aspect, the method further comprises reducing, by one of the application or the user device, an amplitude of the audio version of the identifier to generate an audio version of the identifier having a reduced amplitude. In aspects, the user device transmits the audio version of the identifier over the Bluetooth profile capable of transmitting audio by transmitting the identifier having the reduced amplitude.

In aspects, pairing the audio output device with the application comprises establishing a Bluetooth low energy (BLE) link between the audio output device and the application.

In aspects, managing the audio experience for the user of the audio output device comprises at least one of: playing an audio stream from the audio output device, pausing the audio stream, skipping a portion of the audio stream, or adjusting a level of noise cancellation.

In aspects, the application is further configured to: receive, from the audio output device, information associated with the audio output device and provide, via the application, an indication of the information associated with the audio output device to the user.

Certain aspects provide a computer-readable medium storing instructions which when executed by at least one processor on an audio output device performs a method for pairing the audio output device with an application executed on a user device comprising: receiving, from the user device, an audio identifier transmitted using a Bluetooth profile capable of transmitting audio; generating a data version of the audio identifier; transmitting the data version of the audio identifier in a data packet to the application; and after transmitting the data version of the audio identifier, pairing with the application.

In aspects, transmitting the data version of the audio identifier to the application comprises transmitting the data version of the audio identifier in an advertisement packet. In aspects, transmitting the data version of the audio identifier to the application comprises transmitting the data version of the audio identifier over a Bluetooth low energy (BLE) channel.

In aspects, the instructions further comprise instructions for: after pairing with the application, receiving a command from the application over a Bluetooth low energy (BLE) link for managing an audio experience for a user of the audio output device, and taking action to manage the audio experience responsive to the command.

In aspects, managing the audio experience comprises at least one of: receiving a command from the application to play an audio stream, pause the audio stream, skip a portion of the audio stream, or adjust a level of noise cancellation.

In aspects, the instructions for pairing with the application after transmitting the data version of the audio identifier occur without manual input from a user.

Certain aspects provide a method performed by an audio output device for pairing to an application executed on a user device comprising: establishing a connection between the audio output device and the user device over a Bluetooth profile capable of transmitting audio; receiving, from the user device, an audio identifier transmitted using the Bluetooth profile capable of transmitting audio; generating a data version of the audio identifier; and transmitting the data version of the audio identifier in an advertisement packet transmitted over a Bluetooth low energy (BLE) channel.

In aspects, the method further comprises, after transmitting the data version of the audio identifier, automatically pairing with the application. In aspects, automatically pairing with the application comprises establishing a BLE link with the application without manual user input.

In aspects, the method further comprises, after pairing with the application, receiving a command from the application over the established BLE link to play an audio stream, pause the audio stream, skip a portion of the audio stream, or adjust a level of noise cancellation and taking action responsive to the received command.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

Aspects describe methods for automatically pairing an audio output device to a user device. For illustrative purposes, aspects are described with respect to BLE; however, the methods described herein are not limited to BLE. The described automatic pairing refers to pairing an audio output device to an application running on a user device, wherein the application is configured to accept user input for managing an audio experience of the user. The audio output device may be any type of speaker or part of wearable form factor including headsets, earbuds, audio eyeglasses, open-ear audio devices (such as shoulder-worn or body-worn audio devices) or a sleep mask.

Figure 1:
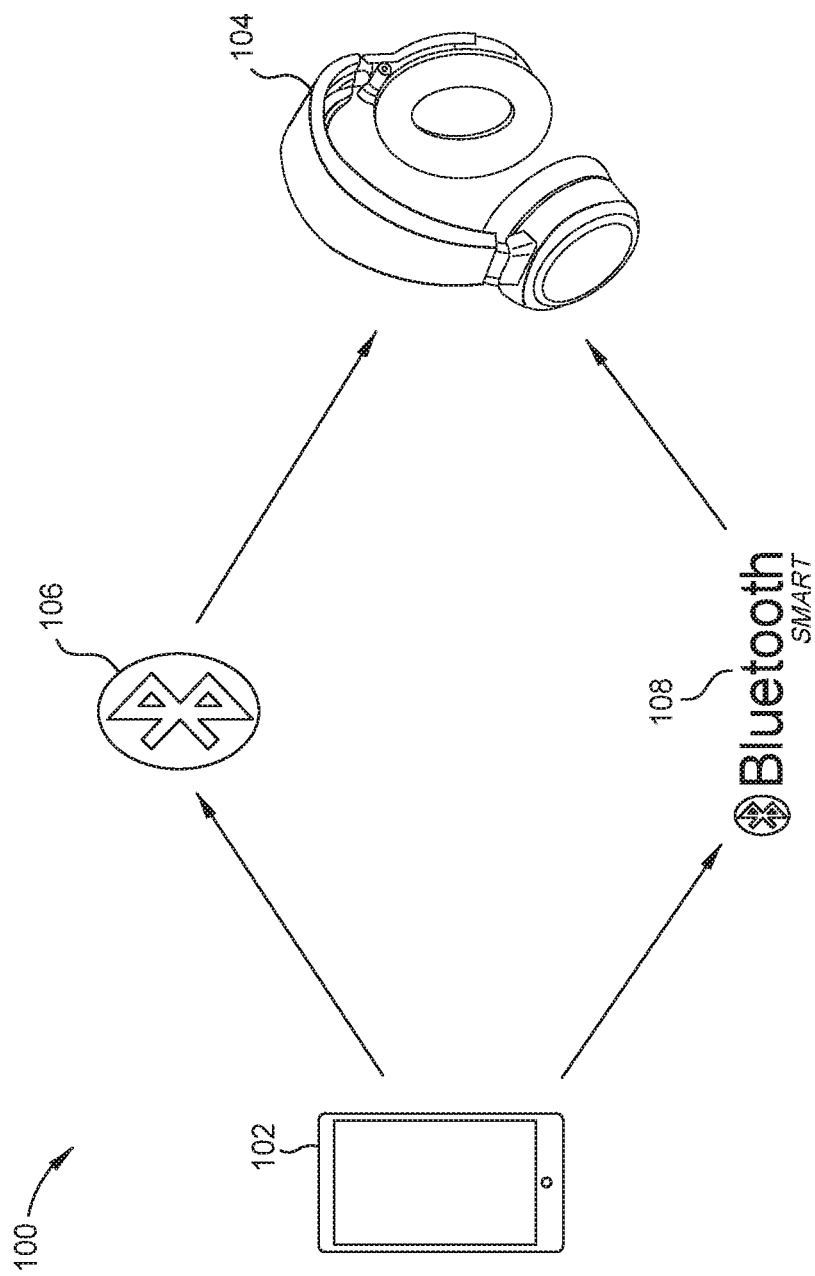
FIG. 1 illustrates an example of a first and second connection between a user device and an audio output device.

FIG. 1 illustrates an example 100 of a first and second connection between a user device and an audio output device. The user device 102 support two types of connections to the audio output device 104: Bluetooth 106 and BLE 108. Bluetooth 106 is used to play music and take phone calls. BLE 108 is used by an application running on the user device 102 to communicate with the audio output device 104. In aspects, the application running on the user device is used to control the audio output, adjust a level of noise cancellation, and access product information of the audio output device, among other possibilities.

Currently, the user device 102 is paired to the audio output device 104 over Bluetooth by navigating to a settings menu on the user device and selecting the audio output device 104. After pairing over Bluetooth, the user device 102 remembers the audio output device 104. In the future, when the audio output device 104 is turned on with Bluetooth enabled, the user device 102 will automatically pair with the audio output device 104. In other words, the user may not need to navigate to the settings menu and manually select the audio output device 104 to establish a Bluetooth connection.

For BLE pairing, an application running on the user device 102 scans for nearby BLE accessories. The application may find a number of BLE accessories and may not know which BLE accessory it is connected to over Bluetooth 106. Therefore, the user selects the desired BLE accessory for BLE pairing each time the user desires pairing the user device 102 and the audio output device 104 over BLE 108.

Not only does the user manually select the audio output device, the user must select the correct audio output device from a set of BLE accessories discovered by the user device. In certain scenarios, such as on an airplane or in a crowded environment, the user device 102 finds several BLE accessories. The user must select the audio output device 104 from the list of discovered BLE accessories.

Figure 2:
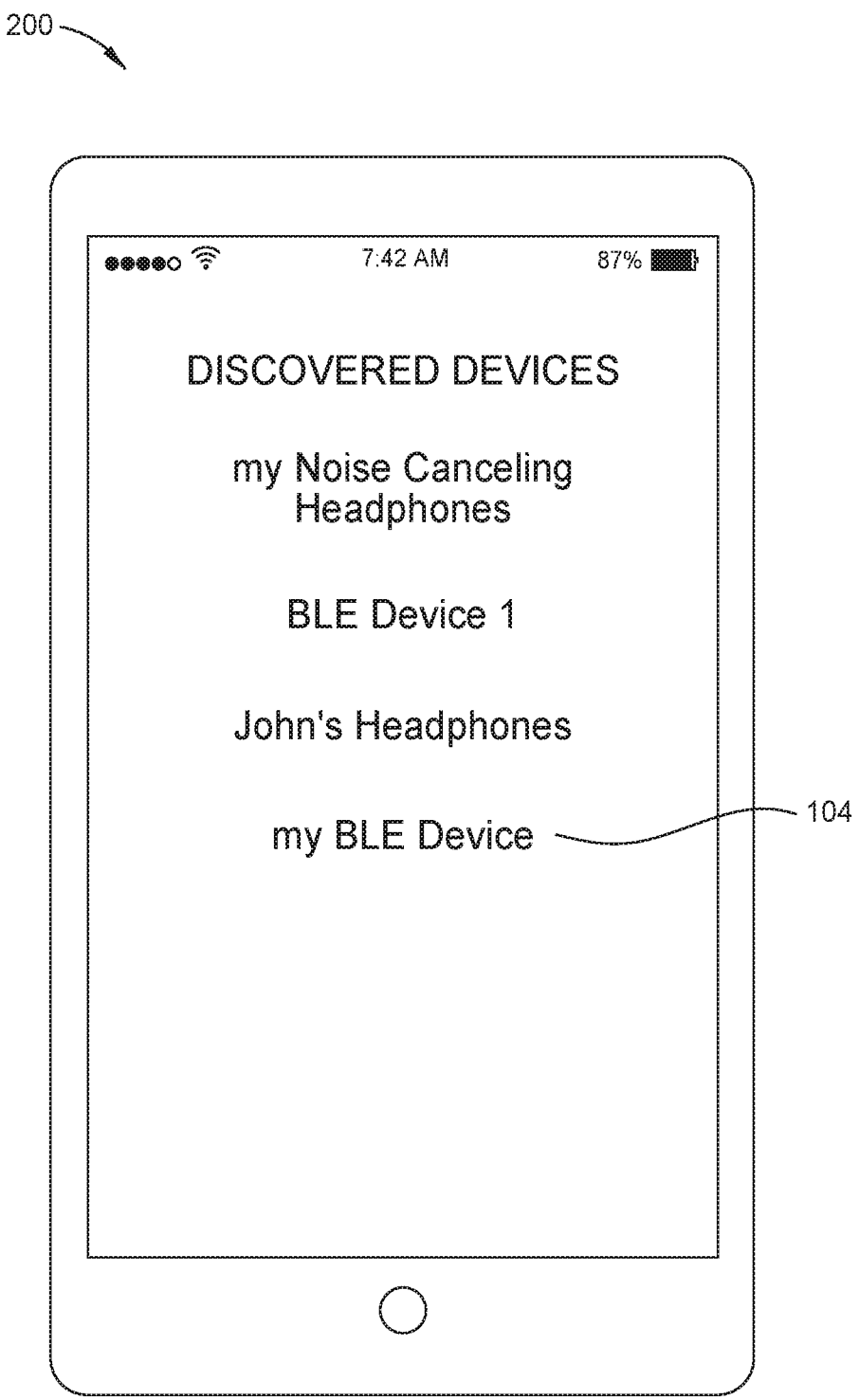
FIG. 2 illustrates an example user interface of an application running on the user device.

FIG. 2 illustrates an example user interface 200 of an application running on the user device 102. The user interface 200 displays a list of BLE accessories discovered by the user device 102. The list of BLE accessories includes the audio output device 104 as well as other devices. In FIG. 2, the user's audio output device has not been renamed by the user. The user may select the device named "my Noise Canceling Headphones" in an attempt to connect to the audio output device 104. When the user device 102 fails to establish a connection with the audio output device 104, the user may select other listed BLE accessories until the user selects his audio output device, named "my BLE device" and the user device 102 pairs with the audio output device 104.

While not illustrated in FIG. 2, the application running on the user device 102 allows the user to name the audio output device, control audio output by playing or pausing audio using the application, check the battery level of the audio output device, and control a level of noise cancellation.

To create a more seamless user experience, aspects describe methods for automatically pairing an audio output device 102 to a user device 104. The automatic pairing described refers to pairing an audio output device to an application running on a user device without user input, wherein after pairing, the application accepts user input for managing an audio experience of the user.

Figure 3:
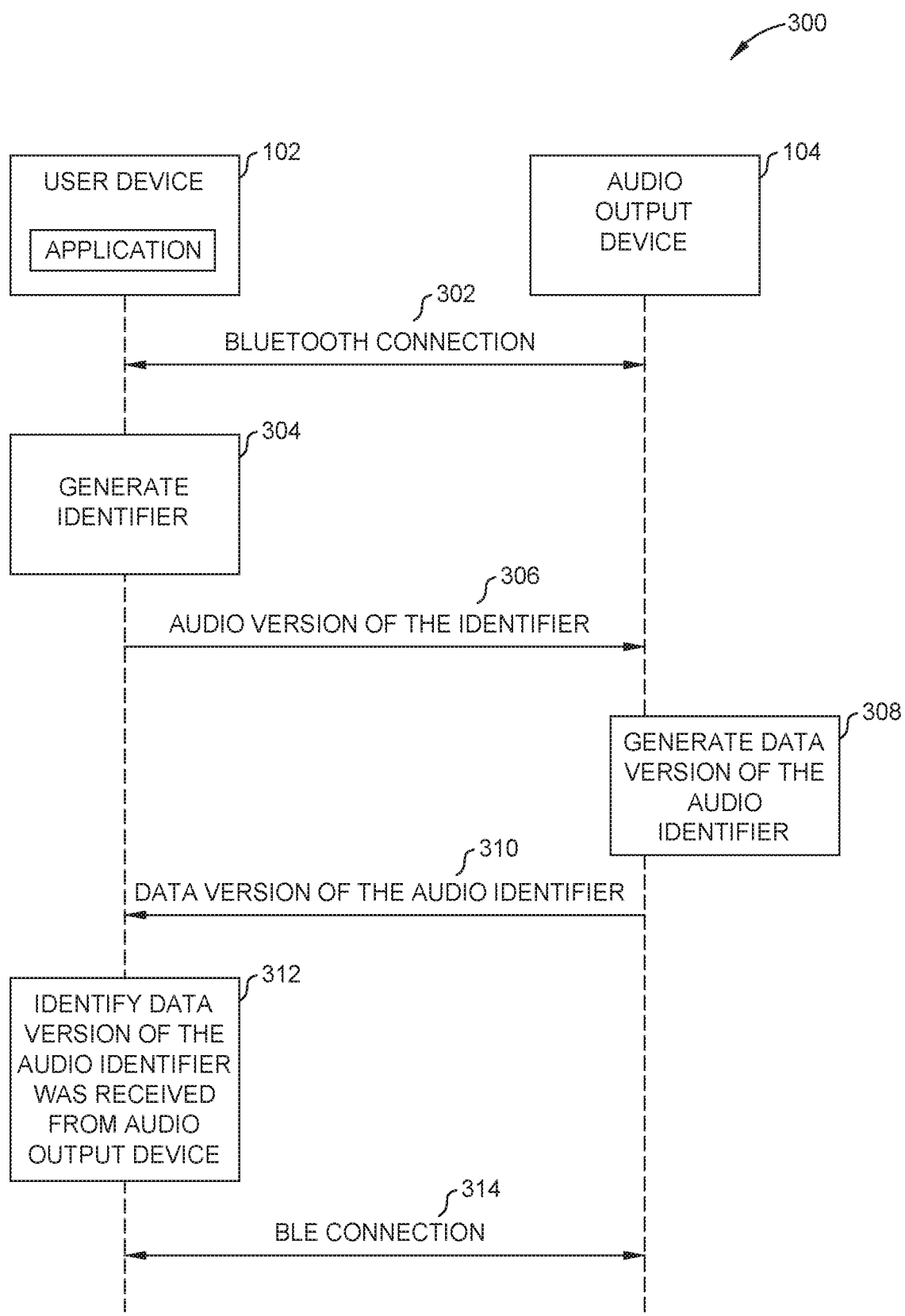
FIG. 3 illustrates an example call-flow diagram for automatically pairing the user device to the audio output device, in accordance with aspects of the present disclosure.

FIG. 3 illustrates an example 300 call-flow diagram for automatically pairing the user device 102 to the audio output device 104, in accordance with aspects of the present disclosure. An application running on the user device 102 is configured to manage an audio experience of the user. Examples for managing the audio experience includes controlling a level of noise cancellation, adjusting the volume of audio output, playing the audio output, or pausing the audio output.

Initially, the user device 102 is communicatively coupled to the audio output device 104 over a Bluetooth profile capable of transmitting audio. Examples of Bluetooth profiles capable of transmitting audio include A2DP and HFP. After an initial Bluetooth connection over a Bluetooth profile capable of transmitting audio is established, the user device 102 automatically pairs with the audio output device 104 over Bluetooth each time the audio output device is turned on with Bluetooth enabled. The connection 302 illustrates that the user device 102 has paired with the audio output device 104 over a Bluetooth profile capable of transmitting audio.

At 304, an application running on the user device 102 generates an identifier. One or more of the application running on the user device or the user device generates an audio version of the identifier that is to be transmitted over the Bluetooth channel. At 306, the user device 102 transmits an audio version of the identifier over the Bluetooth profile capable of transmitting audio.

In an aspect, one or more of the applications running on the user device or the user device uses dual tone multi frequency (DTMF) technology to generate the audio version of the identifier. In an effort to transmit the audio version of the identifier on frequencies substantially outside the range of human hearing, the audio device 102 reduces the amplitude of the frequency range associated with the audio version of the identifier prior to transmission. In aspects, one of the user device or the application reduces the amplitude of the audio version of the identifier to generate an audio version of the identifier having a reduced amplitude. At 306, the user device 102 transmits the audio version of the identifier having the reduced amplitude over the profile capable of transmitting audio.

In other aspects, the audio version of the identifier is transmitted over a profile capable of transmitting audio on frequencies substantially outside an audible range of human hearing. For example, the audio version of the identifier is placed on a carrier frequency and taken outside an audible range of human hearing.

In aspects, inaudible or substantially inaudible DTMF tones are streamed via a Wi-Fi direct enabled devices such as the audio device 102.

At 306, the user device 102 transmits the audio version of the identifier that is substantially inaudible to the user.

At 308, the audio output device 104 generates a data version of the audio identifier received at step 306. At 310, the audio output device 104 transmits the data version of the audio identifier to the application running on the user device 102. The data version of the audio identifier is transmitted over a different channel than the channel on which the audio version of the identifier was transmitted at step 306. In an aspect, the data version of audio identifier is transmitted on a BLE channel. In an example, the data version of the audio identifier is transmitted in a data packet or in an advertisement packet. When the DTMF tones are streamed via a Wi-Fi direct enabled device 102, the audio output device 104 advertises a data version of the received tone(s) in an advertisement packet (e.g., service set identifier (SSID) of a beacon frame).

The application, when scanning for BLE accessories, looks for a data version of the audio identifier that was transmitted by the user device 102 at step 306. The application automatically pairs with the BLE accessory that transmits a data version of the audio identifier. At 312, the application identifies a data version of the audio identifier that was received from the audio output device 104. At 314, the application pairs with the audio output device 104 over a BLE link. From a user point of view, the application pairs with the audio output device without user input, creating a more seamless user experience.

Having established BLE link between the audio output device 104 and the application running on the user device 102, the user is able to manage the audio experience using the application. Examples of managing the audio experience include playing an audio stream from the audio output device, pausing the audio stream, skipping a portion of the audio stream, or adjusting a level of noise cancellation.

While not illustrated, in aspects, the user device 102 receives identifiers from other BLE accessories in the vicinity of the user device 102; however the user device 102 determines that the identifiers received from the other BLE accessories are not a data version of the audio identifier transmitted by the user device at step 306. Therefore, the user device 102 does not automatically pair with any of the other BLE accessories. In aspects, at least one of the identifiers transmitted by one of the non-illustrated BLE accessories and received by the user device 102 is a data version of an audio identifier transmitted by a user device not illustrated in FIG. 3.

In aspects, after establishing the BLE link at 314, the audio output device 102 receives information associated with the audio output device 104 over the BLE link. The information may include a name of the audio output device, a software version used by the audio output device, or any other information about the audio output device. The application running on the user device provides an indication of the information to the user. In an aspect, a user interface running on the user device 102 displays the information to the user.

Figure 4:
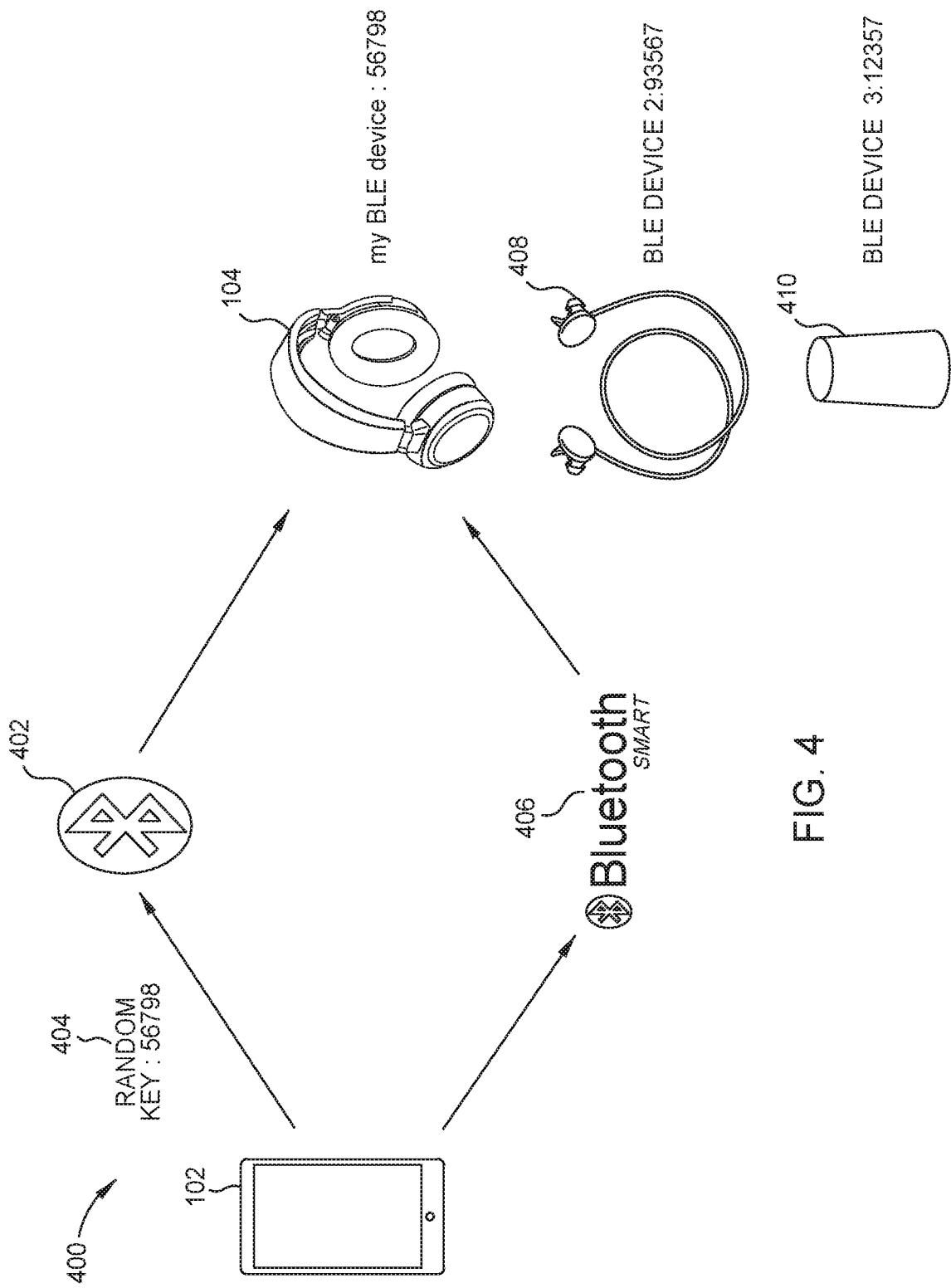
FIG. 4 illustrates an example of automatically pairing the user device and the audio output device, in accordance with aspects of the present disclosure.

FIG. 4 illustrates an example 400 of automatically pairing the user device 102 and the audio output device 104 in accordance with aspects of the present disclosure.

As shown by 402, the user device 102 and the audio output device 104 establish a Bluetooth connection. Thereafter, an application running on the user device 102 generates an identifier. As shown in FIG. 4, the application generates a random sequence key 404. Using DTMF, the random sequence key is transmitted over the established Bluetooth connection.

The audio output device 104 receives the random sequence key 404. The audio output device attaches a data version of the random sequence key to a BLE advertisement packet. When the application running on the user device scans for BLE accessories, it will look for a version of the random sequence key in a BLE advertisement packet and pair to the BLE accessory transmitting a version of the random sequence key. As shown by 406, an application running on the user device 102 and the audio output device 104 establish a BLE connection. From a user point of view, establishing the connection 406 is seamless and does not require user input.

In FIG. 4, the audio output device is the only BLE accessory that transmits a data version of the random sequence key generated by the user device. BLE accessories 408 and 410 received different random sequence keys from non-illustrated user devices. Therefore, while the user device 102 receives a data version of a random sequence key, it will not pair with the BLE accessories 408 or 410 because the received data version of the random sequence key received from the BLE accessories 408 and 410 will not correspond to the random sequence key 404.

It can be noted that descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon. In aspects, both the user device and audio output device have a computer readable medium having computer readable program code embodied thereon for performing the steps described herein and as shown in FIGS. 3 and 4.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for pairing a user device to an audio output device, comprising:
    providing an application on the user device communicatively coupled to the audio output device over a Bluetooth profile capable of transmitting audio, the application configured to accept user input for managing an audio experience for a user of the audio output device;
    generating, by the application, an identifier;
    reducing, by one of the application or the user device, an amplitude of an audio version of the identifier to generate an audio version of the identifier having a reduced amplitude;
    transmitting on a first channel, by the user device, the audio version of the identifier having the reduced amplitude over the Bluetooth profile capable of transmitting audio;
    receiving on a second channel, by the application, the identifier having the reduced amplitude from the audio output device, wherein the first channel and the second channel are different; and
    pairing the audio output device with the application in response to the application receiving the identifier having the reduced amplitude from the audio output device.

2. The method of claim 1, wherein receiving, by the application, the identifier having the reduced amplitude from the audio output device comprises:
    receiving the identifier having the reduced amplitude in a data packet.

3. The method of claim 1, wherein receiving, by the application, the identifier having the reduced amplitude from the audio output device comprises:
    receiving the identifier having the reduced amplitude in an advertisement packet.

4. The method of claim 1, wherein receiving, by the application, the identifier having the reduced amplitude from the audio output device comprises:
    receiving the identifier having the reduced amplitude over a Bluetooth low energy (BLE) channel.

5. The method of claim 1, further comprising:
    using, by one of the application or the user device, dual tone multi frequency (DTMF) technology to generate the audio version of the identifier having the reduced amplitude.

6. The method of claim 1, further comprising:
    generating, by one of the application or the user device, the audio version of the identifier having the reduced amplitude.

7. The method of claim 1, wherein the audio version of the identifier having the reduced amplitude transmitted over the Bluetooth profile capable of transmitting audio comprises a signal occupying frequencies substantially outside an audible range of human hearing.

8. The method of claim 1, wherein pairing the audio output device with the application comprises:
    establishing a Bluetooth low energy (BLE) link between the audio output device and the application.

9. The method of claim 1, wherein the application is further configured to:
    receive, from the audio output device, information associated with the audio output device; and
    provide, via the application, an indication of the information associated with the audio output device to the user.

10. A method for pairing a user device to an audio output device, comprising:
    providing an application on the user device communicatively coupled to the audio output device over a Bluetooth profile capable of transmitting audio, the application configured to accept user input for managing an audio experience for a user of the audio output device, wherein managing the audio experience for the user of the audio output device comprises at least one of: playing an audio stream from the audio output device, pausing the audio stream, skipping a portion of the audio stream, or adjusting a level of noise cancellation;

generating, by the application, an identifier;

transmitting on a first channel, by the user device, an audio version of the identifier over the Bluetooth profile capable of transmitting audio;

receiving on a second channel, by the application, the identifier from the audio output device, wherein the first channel and the second channel are different; and pairing the audio output device with the application in response to the application receiving the identifier from the audio output device.

11. A computer-readable medium storing instructions which, when executed by at least one processor on an audio output device, perform a method for pairing the audio output device with an application executed on a user device comprising:

receiving, on a first channel, from the user device, an audio identifier transmitted using a Bluetooth profile capable of transmitting audio;

generating a data version of the audio identifier;

transmitting on a second channel the data version of the audio identifier in a data packet to the application, wherein the first channel and the second channel are different;

after transmitting the data version of the audio identifier, pairing with the application after pairing with the application, receiving a command from the application over a Bluetooth low energy (BLE) link for managing an audio experience for a user of the audio output device; and taking action to manage the audio experience responsive to the command, wherein managing the audio experience comprises at least one of: receiving a command from the application to play an audio stream, pause the audio stream, skip a portion of the audio stream, or adjust a level of noise cancellation.

12. The computer-readable medium of claim 11, wherein transmitting the data version of the audio identifier to the application comprises:

transmitting the data version of the audio identifier in an advertisement packet.

13. The computer-readable medium of claim 11, wherein transmitting the data version of the audio identifier to the application comprises:

transmitting the data version of the audio identifier over a Bluetooth low energy (BLE) channel.

14. The computer-readable medium of claim 11, wherein the instructions for pairing with the application after transmitting the data version of the audio identifier occur without manual input from a user.

15. A method performed by an audio output device for pairing to an application executed on a user device comprising:

establishing a connection between the audio output device and the user device over a Bluetooth profile capable of transmitting audio;

receiving, on a first channel, from the user device, an audio identifier transmitted using the Bluetooth profile capable of transmitting audio;

generating a data version of the audio identifier;

transmitting, on a second channel, the data version of the audio identifier in an advertisement packet transmitted over a Bluetooth low energy (BLE) channel, wherein the first channel and the second channel are different;

after transmitting the data version of the audio identifier, automatically pairing with the application, wherein automatically pairing with the application comprises establishing a BLE link with the application without manual user input;

after pairing with the application, receiving a command from the application over the established BLE link to play an audio stream, pause the audio stream, skip a portion of the audio stream, or adjust a level of noise cancellation; and taking action responsive to the received command.

* * * * *